United States Patent
Nishida et al.

(10) Patent No.: US 7,813,584 B2
(45) Date of Patent: Oct. 12, 2010

(54) IMAGE REPRODUCTION DEVICE AND IMAGE REPRODUCTION METHOD EMPLOYING A BRIGHTNESS ADJUSTMENT

(75) Inventors: Ikuoh Nishida, Takarazuka (JP); Ryoji Suzuki, Nara (JP); Tetsuya Itani, Ikoma (JP); Satoshi Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/877,132

(22) Filed: Oct. 23, 2007

(65) Prior Publication Data

US 2008/0050034 A1 Feb. 28, 2008

Related U.S. Application Data

(62) Division of application No. 10/502,369, filed as application No. PCT/JP03/15314 on Dec. 1, 2003, now abandoned.

(30) Foreign Application Priority Data

Nov. 29, 2002 (JP) .............................. 2002-347194

(51) Int. Cl.
*G06K 9/40* (2006.01)
(52) U.S. Cl. ........................ 382/274; 348/468; 348/564; 386/95
(58) Field of Classification Search ................ 348/468, 348/564; 386/95; 382/274
See application file for complete search history.

(56) References Cited

U.S. PATENT DOCUMENTS

| | | | |
|---|---|---|---|
| 5,418,576 A * | 5/1995 | Ross | ........................... 348/686 |
| 5,675,391 A | 10/1997 | Yamaguchi et al. | |
| 6,292,228 B1 | 9/2001 | Cho | |
| 6,388,678 B1 | 5/2002 | Kasahara et al. | |

(Continued)

FOREIGN PATENT DOCUMENTS

CN 1241098 A 1/2000

(Continued)

OTHER PUBLICATIONS

European Search Report.

(Continued)

*Primary Examiner*—Bhavesh M Mehta
*Assistant Examiner*—Sean Motsinger
(74) *Attorney, Agent, or Firm*—Panitch Schwarze Belisario & Nadel LLP

(57) ABSTRACT

An image reproducing device includes: an image signal inputting part for receiving input of a first image signal; a sub image signal generating part for generating a sub image signal from information on a sub image extracted from said first image signal; a main image signal decoding part for extracting a main image signal from said first image signal and decoding said main image signal; a brightness detecting part for detecting a brightness of said main image signal and calculating a brightness average value; a brightness adjusting part for adjusting a brightness of said sub image signal based on said brightness average value; an image signal composing part for composing said main image signal and said sub image signal, the brightness of which is adjusted, and generating a second image signal; and an image signal outputting part for outputting said second image signal.

8 Claims, 10 Drawing Sheets

U.S. PATENT DOCUMENTS

| | | | |
|---|---|---|---|
| 6,567,612 | B2 | 5/2003 | Yoshio et al. |
| 6,741,323 | B2 | 5/2004 | Plunkett |
| 6,987,521 | B2 | 1/2006 | Mori et al. |
| 7,043,093 | B2 * | 5/2006 | Asano ..................... 382/274 |
| 7,145,569 | B2 | 12/2006 | Yamamoto |
| 7,191,402 | B2 * | 3/2007 | Kim et al. ................. 715/723 |

FOREIGN PATENT DOCUMENTS

| | | |
|---|---|---|
| EP | 0675644 A2 | 10/1995 |
| JP | 04354480 | 12/1992 |
| JP | 5030442 A | 2/1993 |
| JP | 6006710 A | 1/1994 |
| JP | 07-264503 A | 10/1995 |
| JP | 9219830 A | 8/1997 |
| JP | 11-018108 A | 1/1999 |
| JP | 11-231833 A | 8/1999 |
| JP | 2000-330505 A | 11/2000 |
| JP | 2001309280 A | 11/2001 |

OTHER PUBLICATIONS

Japanese Office Action dated Dec. 1, 2009.
Documents relating to the corresponding Chinese Patent Application No. 200380100182.X including:—the first Office Action dated Mar. 16, 2007; English translation attached; 20 pages;—claims as rejected in the first Office Action; English translation attached; 16 pages;—the Notice of Grant; English translation attached; 2 pages; and—claims as granted; English translation attached; 12 pages.

* cited by examiner

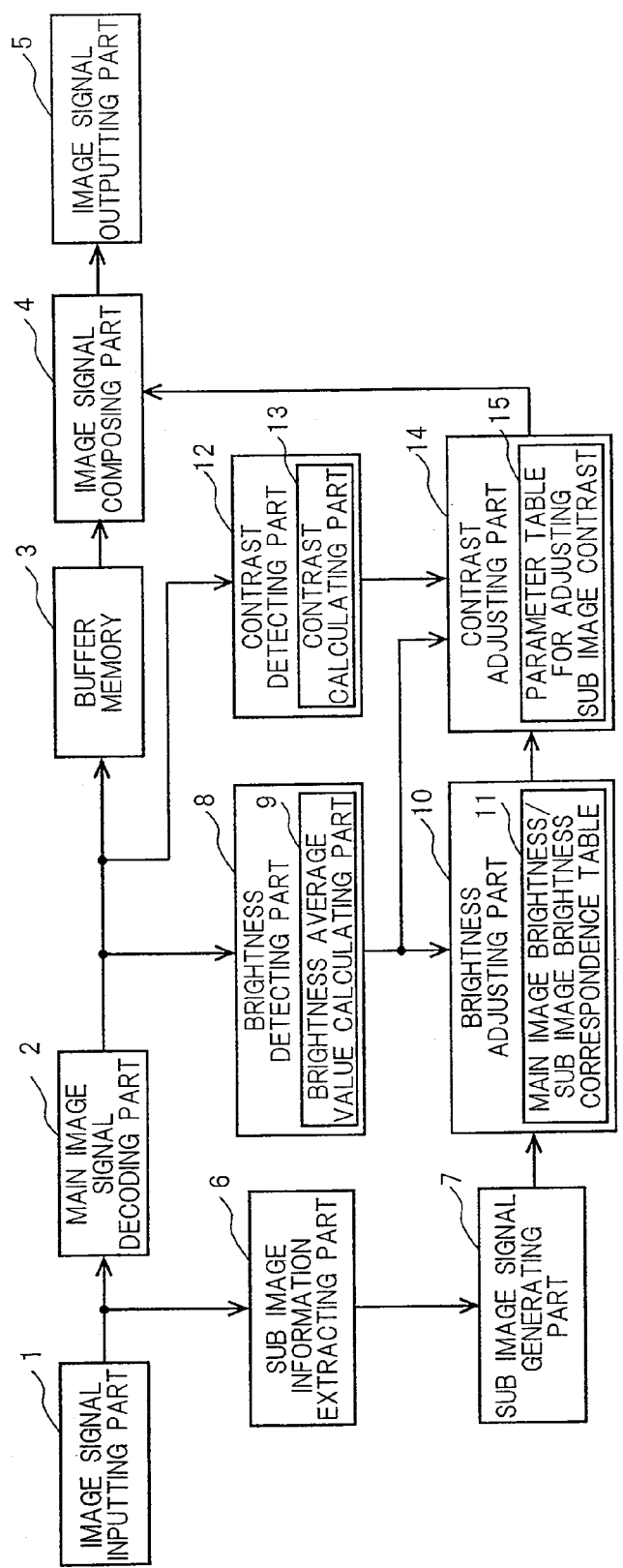
F I G. 5

IMAGE REPRODUCTION DEVICE AND IMAGE REPRODUCTION METHOD EMPLOYING A BRIGHTNESS ADJUSTMENT

CROSS-REFERENCE TO RELATED APPLICATIONS

This application is a Division of U.S. application Ser. No. 10/502,369, filed Jul. 23, 2004, which is a Section 371 of International Application No. PCT/JP2003/015314, filed Dec. 1, 2003 and the disclosure of which is incorporated herein by reference.

BACKGROUND OF THE INVENTION

The present invention relates to an image reproducing device and an image reproducing method.

Computerized data stored in a recording medium such as DVD (hereinafter referred to as "content") and the contents distributed from dynamic image distribution servers or digital video broadcast are as diverse as movies, concerts and sports. The image signal of movie content among these contents includes sub image information such as subtitles in addition to a main image signal compressed according to MPEG2 system.

Unexamined Patent Publication Hei 4-354480 discloses a prior art brightness control circuit. The prior art brightness control circuit receives input of an image signal of cinema scope size (there is a black part of predetermined size on each of the upper and lower sides of an image of a main part and a subtitle appears in the lower black part), detects the subtitle part of the image signal when the image signal reaches a continuous black level, and controls the luminance (brightness) of a character of the subtitle part to a predetermined level.

The prior art brightness control circuit controls the luminance of a character of the subtitle part to a predetermined level independent of the brightness of the image of the main part (main image). Therefore, when the brightness and/or contrast of the image of the main part is high (picture is bright and/or sharp), the subtitle part is hard to see because of being relatively dark and/or low in contrast. On the contrary, when the brightness and/or contrast of the image of the main part is low (picture is dark and/or outline is represented softly), the subtitle part is hard to see because of its glare.

The present invention solves the above-mentioned conventional problem and intend to an image reproducing device and an image reproducing method of displaying easily viewable main image and sub image even when the main image is in a bright or dark scene and/or the main image is sharp or soft, thereby to minimize eyestrain of users.

BRIEF SUMMARY OF THE INVENTION

To solve the above-mentioned conventional problem, the present invention has the following configuration. An image reproducing device from one aspect of the present invention comprises an image signal inputting part for receiving input of a first image signal; a sub image signal generating part for generating a sub image signal from information on a sub image extracted from the above-mentioned first image signal; a main image signal decoding part for extracting a main image signal from the above-mentioned first image signal and decoding the above-mentioned main image signal; a brightness detecting part for detecting a brightness of the above-mentioned main image signal and calculating a brightness average value; a brightness adjusting part for adjusting a brightness of the above-mentioned sub image signal based on the above-mentioned brightness average value; an image signal composing part for composing the above-mentioned main image signal and the above-mentioned sub image signal, the brightness of which is adjusted, and generating a second image signal; and an image signal outputting part for outputting the above-mentioned second image signal.

The image reproducing device of the present invention adjusts the brightness of the sub image signal based on the brightness average value of the main image signal. That is, when the main image signal is bright, the brightness of the sub image signal is adjusted to be high and when the main image signal is dark, the brightness of the sub image signal is adjusted to be low. Further, the device composes the main image signal and the sub image signal, the brightness of which is adjusted, and outputs the composed signal. The present invention has the effect of realizing the image reproducing device for outputting an image signal that does not cause much eyestrain and is easily viewable for users. The "brightness average value" may be the brightness average value of the whole region where the image signal is displayed (valid region) or the brightness average value of a predetermined region located at a predetermined position of the valid region. Preferably, the "predetermined position" is a center part of the valid region.

The above-mentioned image reproducing device from another aspect of the present invention further comprises a contrast adjusting part for adjusting a contrast of the above-mentioned sub image signal based on the above-mentioned brightness average value, and the above-mentioned image signal composing part composes the above-mentioned main image signal and the above-mentioned sub image signal, the brightness and the contrast of which are adjusted, and generates a second image signal.

The image reproducing device of the present invention adjusts the contrast of the sub image signal based on the brightness average value of the main image signal. That is, when the main image signal is bright, the contrast of the sub image signal is adjusted to be strong and when the main image signal is dark, the contrast of the sub image signal is adjusted to be weak. Further, the device composes the main image signal and the sub image signal, the brightness of which is adjusted, and outputs the composed signal. The present invention has the effect of realizing the image reproducing device for outputting an image signal that does not cause much eyestrain and is easily viewable for users.

The above-mentioned image reproducing device from another aspect of the present invention further comprises a contrast detecting part for detecting a contrast of the above-mentioned main image signal, and the above-mentioned brightness adjusting part adjusts the brightness of the sub image signal based on the above-mentioned brightness average value and the above-mentioned contrast.

The image reproducing device of the present invention adjusts the brightness of the sub image signal based on the brightness average value and the contrast of the main image signal. That is, when the main image signal is bright or the contrast is strong, the brightness of the sub image signal is adjusted to be high and when the main image signal is dark and the contrast is weak, the brightness of the sub image signal is adjusted to be low. Further, the device composes the main image signal and the sub image signal, the brightness of which is adjusted, and outputs the composed signal. The present invention has the effect of realizing the image reproducing device for outputting an image signal that does not cause much eyestrain and is easily viewable for users.

The above-mentioned image reproducing device from another aspect of the present invention further comprises a contrast detecting part for detecting the contrast of the above-mentioned main image signal; and a contrast adjusting part for adjusting the contrast of the above-mentioned sub image signal based on the above-mentioned contrast or the above-mentioned brightness average value and the above-mentioned contrast, and the above-mentioned image signal composing part composes the above-mentioned main image signal and the above-mentioned sub image signal, the brightness and the contrast of which are adjusted, and generates a second image signal.

The image reproducing device of the present invention adjusts the contrast of the sub image signal based on the brightness average value and the contrast of the main image signal. That is, when the main image signal is bright or the contrast is strong, the contrast of the sub image signal is adjusted to be strong and when the main image signal is dark or the contrast is weak, the contrast of the sub image signal is adjusted to be weak. Further, the device composes the main image signal and the sub image signal, the brightness of which is adjusted, and outputs the composed signal. The present invention has the effect of realizing the image reproducing device for outputting an image signal that does not cause much eyestrain and is easily viewable for users.

The above-mentioned image reproducing device from another aspect of the present invention further comprises an external brightness detecting part for detecting an external brightness as a brightness of a space where the above-mentioned second image signal is displayed; and a main image brightness adjusting part for adjusting the brightness of the above-mentioned main image signal based on the above-mentioned external brightness, and the above-mentioned brightness detecting part detects the brightness of the above-mentioned main image signal, the brightness of which is adjusted, and calculates a brightness average value, and the above-mentioned image signal composing part composes the above-mentioned main image signal, the brightness of which is adjusted, and the above-mentioned sub image signal, the brightness of which is adjusted or the brightness and the contrast of which are adjusted, and generates a second image signal.

The image reproducing device of the present invention adjusts the brightness of the main image signal based on the brightness of external light and then calculates the brightness average value of the main image signal to adjust the brightness of the sub image signal based on the brightness average value. When external light enters into the display that displays the image, the image is hard to see for users. In the image reproducing device of the present invention, when the illuminance of the place where the display device is located is high, the brightness of the main image signal is made to be high and accordingly the brightness of the sub image signal is made to be high or the brightness of the sub image signal is made to be high to strengthen the contrast. When the illuminance of the place where the display device is located is low, the brightness of the main image signal is made to be low and accordingly the brightness of the sub image signal is made to be low or the brightness of the sub image signal is made to be low to weaken the contrast. The present invention has the effect of realizing the image reproducing device for outputting an image signal that does not cause much eyestrain and is easily viewable for users.

The "external brightness" refers to the illuminance of the place where a display device for displaying the second image signal is installed. Typically, it is an output signal (output signal according to the input light quantity) of a photo detecting device that is located in the periphery of the display device connected to the image signal outputting part and receives a part of light radiated from outside toward the display screen.

The above-mentioned image reproducing device from another aspect of the present invention further comprises an external brightness detecting part for detecting an external brightness as a brightness of a space where the above-mentioned second image signal is displayed; and a main image brightness adjusting part for adjusting the brightness of the above-mentioned main image signal based on the above-mentioned external brightness, and the above-mentioned brightness adjusting part adjusts the brightness of the sub image signal based on the above-mentioned external brightness and the brightness of the above-mentioned main image signal, the brightness of which is not adjusted, and the above-mentioned image signal composing part composes the above-mentioned main image signal, the brightness of which is adjusted, and the above-mentioned sub image signal, the brightness of which is adjusted, and generates a second image signal.

The present invention has the effect of realizing the image reproducing device for outputting an image signal that does not cause much eyestrain and is easily viewable for users according to the external brightness.

The above-mentioned image reproducing device from another aspect of the present invention further comprises an external brightness detecting part for detecting an external brightness as a brightness of a space where the above-mentioned second image signal is displayed; and a main image brightness adjusting part for adjusting the brightness of the above-mentioned main image signal based on the above-mentioned external brightness, and the above-mentioned contrast adjusting part adjusts the contrast of the above-mentioned sub image signal based on the above-mentioned external brightness and the brightness of the main image signal, the brightness of which is not adjusted, and the above-mentioned image signal composing part composes the above-mentioned main image signal, the brightness of which is adjusted, and the above-mentioned sub image signal, the brightness and the contrast of which are adjusted, and generates a second image signal.

The present invention has the effect of realizing the image reproducing device for outputting an image signal that does not cause much eyestrain and is easily viewable for users according to the external brightness.

The above-mentioned image reproducing device from another aspect of the present invention further comprises a storing part for storing the above-mentioned main image signal and outputting the above-mentioned main image signal with a delay, and the above-mentioned image signal composing part composes the above-mentioned main image signal, the brightness average value of which is calculated and which is output from the above-mentioned storing part with a delay, and the above-mentioned sub image signal, the brightness of which is adjusted based on the above-mentioned brightness average value.

Without the storing part for delaying the main image signal, the brightness of the sub image signal of the next frame (or the next field) is adjusted based on the brightness average value of the main image signal of 1 frame (or 1 field). In the configuration, however, when the brightness average value of the main image signal varies abruptly due to switch of the picture of the main image, the brightness of the sub image signal is adjusted with a delay of 1 frame (or 1 field). The deviation between the brightness variation timing of the main image signal and the brightness variation timing of the sub image signal causes users to have a visually uncomfortable feeling. The present invention has the effect of realizing the image reproducing device that varies the brightness of both the main image signal and the sub image signal concurrently even when the brightness average value of the main image signal varies abruptly. Even when the brightness average value of the main image signal varies abruptly, the brightness of the sub image signal varies without giving users a visually uncomfortable feeling.

In the above-mentioned image reproducing device from another aspect of the present invention, when a difference between the brightness average value of the above-mentioned main image signal of a preceding picture and the brightness average value of the above-mentioned main image signal of a present picture is not greater than a predetermined threshold, or when a difference between the brightness value of the above-mentioned sub image signal of the preceding picture and the brightness value of the above-mentioned sub image signal corresponding to the brightness average value of the above-mentioned main image signal of the present picture is not greater than a predetermined threshold, the above-mentioned brightness adjusting part adjusts the brightness of the above-mentioned sub image signal to be a value corresponding to the brightness average value of the above-mentioned main image signal of the present picture at a predetermined time constant; and when a difference between the brightness average value of the above-mentioned main image signal of a preceding picture and the brightness average value of the above-mentioned main image signal of a present picture is greater than a predetermined threshold, or when a difference between the brightness value of the above-mentioned sub image signal of the preceding picture and the brightness value of the above-mentioned sub image signal corresponding to the brightness average value of the above-mentioned main image signal of the present picture is greater than a predetermined threshold, the above-mentioned brightness adjusting part adjusts the brightness of the above-mentioned sub image signal to be a value corresponding to the brightness average value of the above-mentioned main image signal of the present picture instantly.

When the brightness of the sub image signal varies subtly at every moment according to the variation in the brightness of the main image signal, users feel inconvenience and suffer much eyestrain. On the other hand, in the case where the brightness average value of the main image signal varies abruptly, when a delay in brightness variation of the sub image signal occurs, users have a visually uncomfortable feeling. The present invention has the effect of realizing the image reproducing device that outputs the sub image signal of stable brightness when the brightness variation of the main image signal is small and varies abruptly the sub image signal at the same timing when the brightness average value of the main image signal varies abruptly.

The "brightness average value of the main image signal of the preceding picture" may be a brightness average value of the main image signal of the immediately preceding picture. For example, the brightness average value may be calculated by assigning a predetermined weight to the main image signals of the plural preceding pictures by use of a predetermined computing equation.

The method of "adjusting the brightness of the sub image signal to be the value corresponding to the brightness average value of the present picture at a predetermined time constant" is arbitrary.

An image reproducing method from another aspect of the present invention is derived from the similar technical concept to that of the above-mentioned image reproducing method.

The novel features of the invention are set forth with particularity in the appended claims. The invention as to both structure and content, and other objects and features thereof will best be understood from the detailed description when considered in connection with the accompanying drawings.

BRIEF DESCRIPTION OF THE SEVERAL VIEWS OF THE DRAWINGS

FIG. 5 is a block diagram of an image reproducing device in accordance with a second embodiment of the present invention;

Part or All of the drawings are drawn schematically for diagrammatic representation and it should be considered that they do not necessarily reflect relative size and position of components shown therein.

DETAILED DESCRIPTION OF THE INVENTION

Embodiments embodying best mode for carrying out the present invention will be described along with drawings.

First Embodiment

Referring to FIG. 1 to FIG. 4, an image reproducing device (including an image reproducing method) in accordance with a first embodiment of the present invention will be described.

Figure 1:
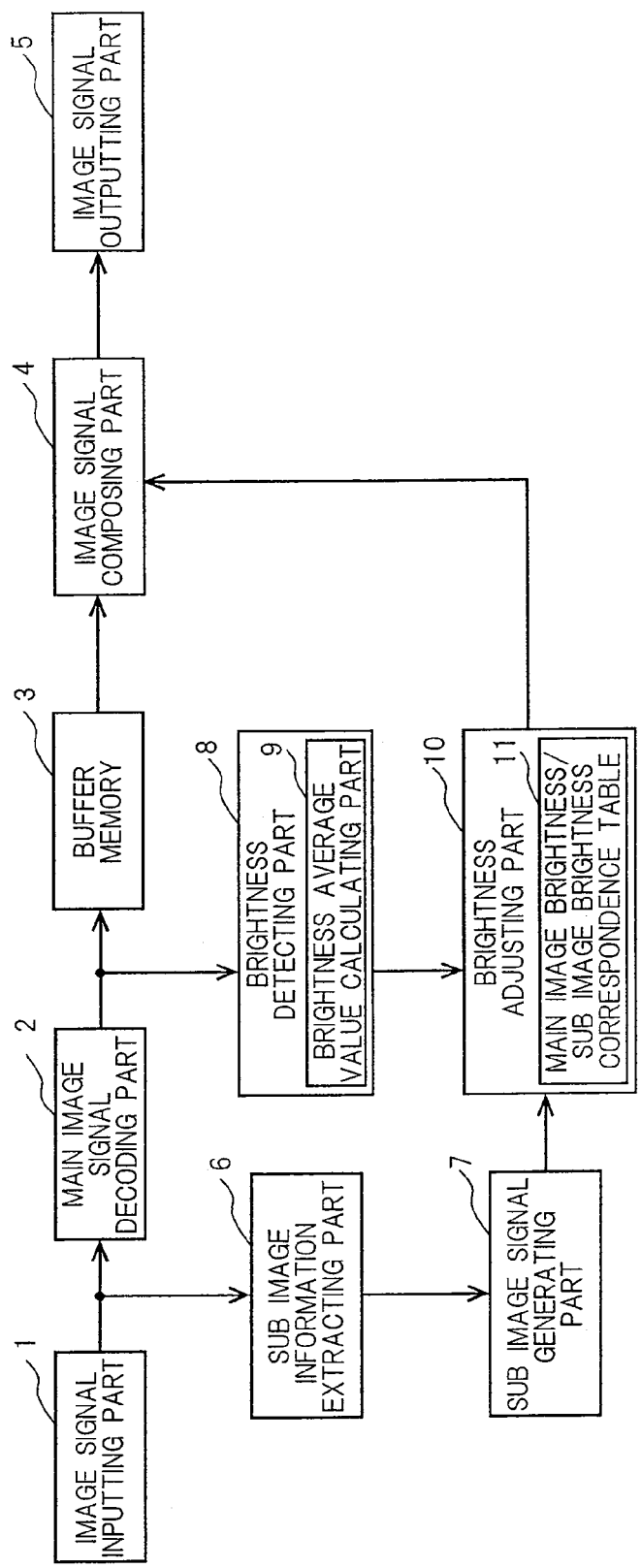
FIG. 1 is a block diagram of an image reproducing device in accordance with a first embodiment of the present invention.

FIG. 1 is a block diagram for showing the configuration of the image reproducing device in accordance with the first embodiment of the present invention. The image reproducing device in accordance with the first embodiment receives an input of an image signal read from a DVD (not shown), extracts a main image signal (image of a main part) and sub image information such as subtitle from the image signal, adds a sub image to a main image and outputs it to an external display device (not shown). In the first embodiment, the image signal is a digital data stream and includes the main signal compressed by MPEG-2 technology and sub image information such as subtitle. The main image signal is dynamic image data and its brightness varies with time. Typically, the brightness of a sub image signal for displaying subtitles does not vary with time. In the image reproducing device of the first embodiment, the brightness of the sub image signal is adjusted based on a brightness average value of the main image signal.

FIG. 1 shows an image signal inputting part 1, a main image signal decoding part 2, a buffer memory 3, an image signal composing part 4, an image signal outputting part 5, a sub image information extracting part 6, a sub image signal generating part 7, a brightness detecting part 8 and a brightness adjusting part 10. The brightness detecting part 8 has a brightness average value calculating part 9. The brightness adjusting part 10 has a main image brightness/sub image brightness correspondence table 11.

Operation of each block of the image reproducing device in accordance with the first embodiment will be described. The image signal inputting part 1 receives an input of the image signal (first image signal) and transfers the signal to the main image signal decoding part 2 and the sub image information extracting part 6. The main image signal decoding part 2 extracts a compressed main image signal from the first image signal and expands the main image signal to the buffer memory 3 and the brightness detecting part 8. The buffer memory 3 stores the main image signal therein and outputs it with a delay. The sub image information extracting part 6 extracts sub image information from the first image signal and transfers the information to the sub image signal generating part 7. In the first embodiment, the sub image information is the content of subtitle displayed on the main image and a display position of the subtitle. The sub image signal generating part 7 generates a sub image signal based on the sub image information and transfers the sub image signal to the brightness adjusting part 10. The image signal is a bit pattern of the subtitle. The brightness average value calculating part 9 of the brightness detecting part 8 calculates a brightness average value of the main image signal. A method of calculating the brightness average value will be described later. The brightness adjusting part 10 adjusts brightness of the sub image based on the brightness average value of the main image signal and transfers the sub image signal to the image signal composing part 4. A method of adjusting the brightness of the sub image will be described later. The image signal composing part 4 composes the sub image signal, the brightness of which is adjusted based on the brightness average value of the main image signal in the brightness adjusting part 10 and which is output therefrom, and the main image signal read from the buffer memory 3 in sync with time, and transfers the composed image signal of the main image signal and the sub image signal (second image signal) to the image signal outputting part 5. A method of composing the two image signals is arbitrary. For example, the signal in a predetermined region of the main image signal may be replaced with the sub image signal (so-called non-additive mix). The predetermined region may be character representation including outline or rectangular background region including character representation. For example, the second image signal may be generated by adding the brightness of the sub image signal to the brightness of the main image signal (so-called additive mix). The predetermined brightness level of the sub image signal is set as 0 level for addition operation and in the outline part of the sub image signal, the brightness of the second image signal may be set to be lower than the original brightness of the main image signal. The image signal outputting part 5 transfers the image signal with subtitle (second image signal) to an external device.

Figure 2:
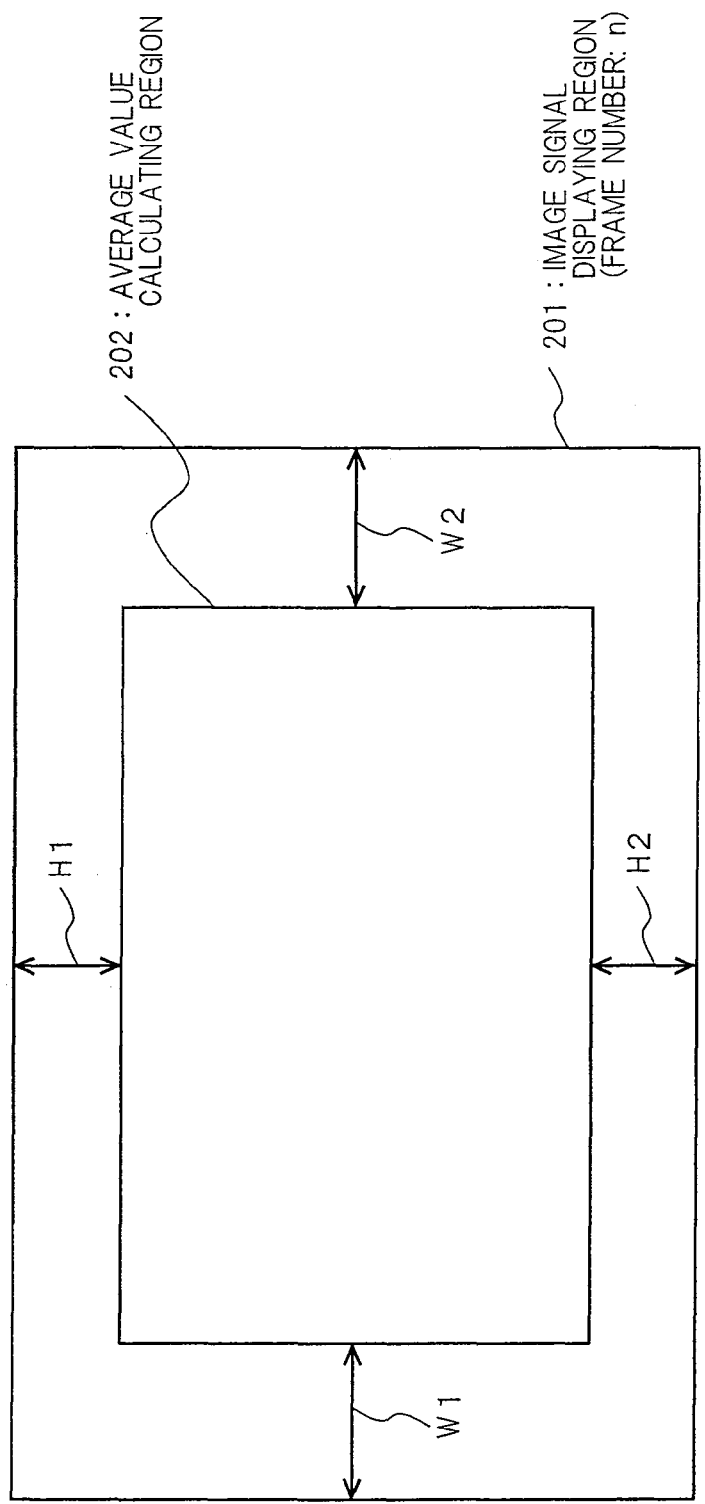
FIG. 2 is a schematic diagram for showing an image signal displaying region and an average value calculating region.

Next, referring to FIG. 2 and FIG. 3, a method of calculating the brightness average value of the main image signal in the brightness average value calculating part 9 will be described. The brightness average value calculating part 9 calculates the brightness average value of the main image signal for each field. FIG. 2 is a schematic diagram for showing an image signal displaying region and an average value calculating region. In FIG. 2, the image signal displaying region 201 is a display region of the main image signal of n-th field. The average value calculating region 202 is a rectangular region obtained by excluding upper H2 pixels, left W1 pixels, right W2 pixels and lower H2 pixels from the image signal displaying region 201. The brightness average value calculating part 9 calculates the brightness average value of the main image signal in the average value calculating region 202.

Figure 3:
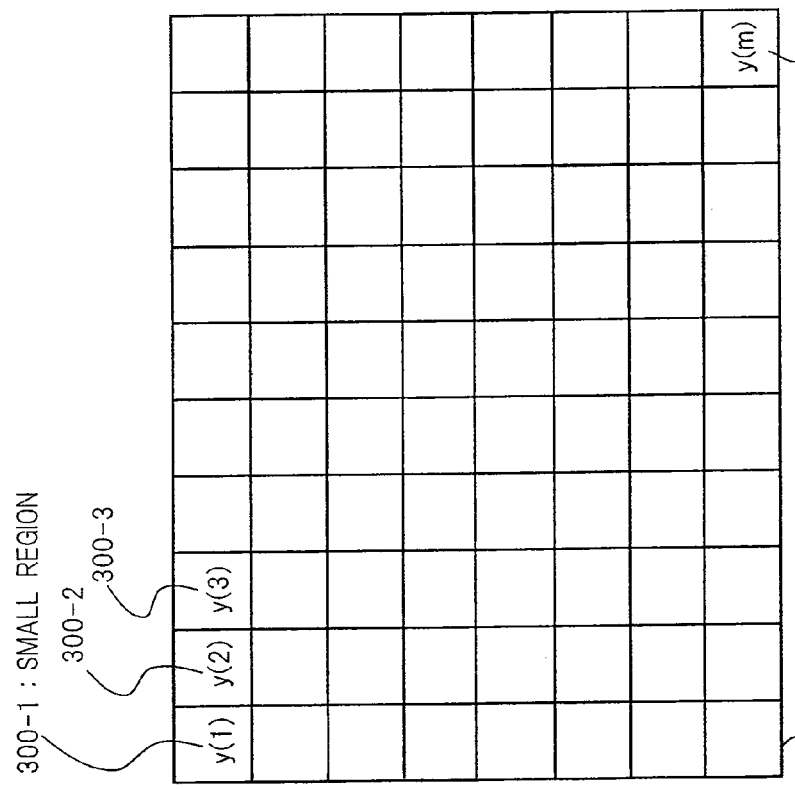
FIG. 3 is a schematic diagram for showing an average value calculating method in the average value calculating region.

FIG. 3 is a schematic diagram for showing an average value calculating method in the average value calculating region 202. The average value calculating region 202 is divided into m number of small regions 300-1, 300-2, 300-3, . . . , 300-$m$. Each small region has the shape of rectangle of a predetermined number (for example 6) of pixels high and a predetermined number (for example 8) of pixels wide. The brightness average value calculating part 9 calculates an average value y(k) (where $1 \leq k \leq m$) of a greatest value and a smallest value in brightness in each small region and further calculates an average value y(k) in the whole average value calculating region 202 (that is, $\Sigma y(k)/m$). Furthermore, the brightness average value calculating part 9 calculates a mean value (moving average value) of a brightness average value of the preceding field (that is, n−1-th field) Y(n−1) and the brightness average value of n-th field $\Sigma y(k)/m$ and defines the mean value as a brightness average value Y(n) of the main image signal of n-th field.

$$Y(n)=\{\Sigma y(k)/m+Y(n-1)\}/2$$

Alternatively, $Y(n)=a \cdot \Sigma y(k)/m+(1-a) \cdot Y(n-1)$ may be applied (a is any value of $0<a<1$). When a is an approximate value of 0, the brightness of the sub image signal is stable and varies slowly with respect to variation in the brightness of the main image signal. When a is an approximate value of 1, the brightness of the sub image signal varies with a high responsibility with respect to variation in the brightness of the main image signal. The value of a can be set to be an optimum value by researching impressions that viewers get from the composite picture of various images. The computing equation of the first embodiment corresponds to a=0.5.

In FIG. 2, W1=W2 and H1=H2 may be set. W1=W2=H1=H2 may also be set. W1=W2=0 and/or H1=H2=0 may be set. In the case of W1=W2=0 and H1=H2=0, the average value calculating region 202 becomes the whole display screen. In FIG. 3, a small region may be set as 1 pixel.

Figure 4:
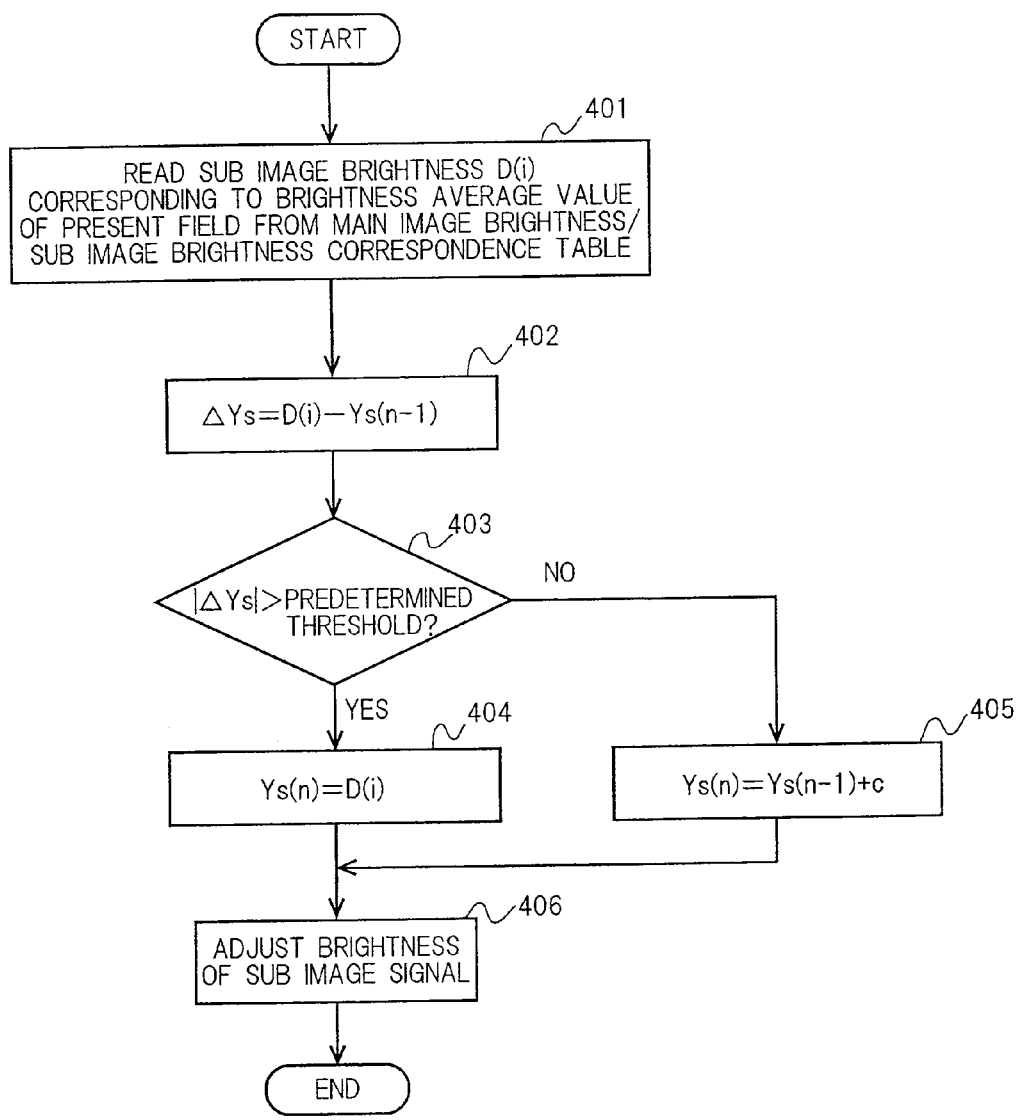
FIG. 4 is a flow chart of a brightness adjusting method in accordance with the first embodiment of the present invention.

Next referring to FIG. 4, a method of adjusting the brightness of the sub image signal in the brightness adjusting part 10 will be described. FIG. 4 is a flow chart of the brightness adjusting method in accordance with the first embodiment of the present invention. At a step 401, the brightness adjusting part 10 reads a reference brightness of the sub image signal D(i) (target brightness) ($1 \leq i<p$) corresponding to the brightness average value Y(n) of the main image signal of the present field (n-th field) from the main image brightness/sub image brightness correspondence table 11. The main image brightness/sub image brightness correspondence table 11 provides a maximum value and a minimum value for each gradation of plural gradations (for example, 6 gradations. p is an arbitrary positive integer.) into which the brightness average value of the main image signal is divided, and the reference brightness of the sub image signal corresponding to the graduation. For example, the reference brightness of the sub image signal in the case of $0<Y(n)<d(1)$ is set as D(1), the reference brightness of the sub image signal in the case of $d(1) \leqq Y(n) < d(2)$ is set as $D(2)$, ... and the reference brightness of the sub image signal in the case of $d(p-1) \leqq Y(n) < d(p)$ is set as $D(p)$ (where $0 < d(1), d(2) < ... < d(p), D(1) < D(2) ... D(p))$.

At a step 402, the brightness adjusting part 10 calculates a difference $\Delta Ys = D(i) - Ys(n-1)$ between the reference brightness $D(i)$ of the sub image signal of the present field and an actual brightness $Ys(n-1)$ of the sub image signal of the preceding field. At a step 403, it is determined whether $\Delta Ys$ is not less than a predetermined threshold or not.

When $\Delta Ys$ is not less than the predetermined threshold, the actual brightness of the sub image signal of the present field is made to be the reference brightness $D(i)$ instantly (step 404) and when $\Delta Ys$ is less than the predetermined threshold, the actual brightness of the sub image signal of the present field is made to gradually get close to the reference brightness $D(i)$ from the present actual brightness $Ys(n-1)$ at a predetermined time constant. In the first embodiment, the actual brightness of the sub image signal of the present field $Ys(n)$ is made to be $Ys(n-1)+c$ (step 405). Here, c is a value calculated by the present actual brightness $Ys(n-1)$ and the reference brightness $D(i)$ and when $Ys(n-1) < D(i)$, the relationship $Ys(n-1) < Ys(n-1)+c < D(i)$ is satisfied. For example, in the case where the actual brightness of the sub image signal is changed from the present actual brightness $Ys(n-1)$ to the reference brightness $D(i)$ over T seconds, $c = \{D(i) - Ys(n-1)\}/T$ may be set. $c = \pm 1$ may be set. In this case, the actual brightness $Y(s)$ is incremented or decremented at each predetermined time to converge on the reference brightness $D(i)$.

Next, when executing the flowchart of FIG. 4, the present actual brightness is made to be $Ys(n+1) = Ys(n)+c$ at the step 405. Next, the present actual brightness is made to be $Ys(n+2) = Ys(n+1)+c$ at the step 405.

At a step 406, the brightness adjusting part 10 adjusts the brightness of the sub image signal (in the first embodiment, the brightness level of the white character as the subtitle part) to be the value determined at the step 404 or step 405 and finishes its operation.

According to the brightness adjusting method shown in the flowchart of FIG. 4, when the brightness average value of the main image signal does not vary with time as it is $Y(n)$, the brightness of the sub image signal converges on the reference brightness $D(i)$ gradually. The method of making the brightness of the sub image signal converge on the reference brightness $D(i)$ gradually is arbitrary and the brightness of the sub image signal may be changed in a nonlinear manner.

As substitute for the configuration of the first embodiment, the brightness adjusting part 10 may calculates the difference $\Delta Y = \Sigma y(k)/m - Y(n-1)$ between the brightness average value of the main image signal of the present field $\Sigma y(k)/m$ and the brightness average value of the main image signal of the preceding field $Y(n-1)$ at the step 402. At the step 403, it is determined whether the absolute value of $\Delta Y$ is not less than a predetermined threshold or not.

When $\Delta Y$ is greater than the predetermined threshold, the brightness average value of the main image signal of the present field is made to be $Y(n) = \Sigma y(k)/m$ and the reference brightness $D(i)$ of the sub image signal corresponding to $Y(n) = \Sigma y(k)/m$ is read from the table. The actual brightness of the sub image signal of the present field is made to be the reference brightness $D(i)$ instantly (step 404).

When $\Delta Y$ is not greater than the predetermined threshold, the brightness average value of the main image signal of the present field is made to be $Y(n) = \{\Sigma y(k)/m + Y(n-1)\}/2$ and the reference brightness of the sub image signal corresponding to $Y(n)$ is defined as $D(i)$. In this case, the actual brightness of the sub image signal of the present field $Ys(n)$ is made to be $Ys(n-1)+c$ (step 405). c is a value calculated by the present actual brightness $Ys(n-1)$ and the reference brightness $D(i)$.

At the step 406, the brightness adjusting part 10 adjusts the brightness of the sub image signal (in the first embodiment, the brightness level of the white character of the subtitle part) to be the value determined at the step 404 or step 405 and finishes its operation.

According to the above-mentioned brightness adjusting method, when the difference between brightness average value of the main image signal of the preceding picture and the brightness average value of the present picture is not greater than a predetermined threshold, or when the difference between the actual brightness of the sub image signal of the preceding picture and the reference brightness of the sub image signal of the present picture (the value corresponding to the brightness average value of the main image signal) is not greater than a predetermined threshold, the brightness adjusting part 10 adjusts the brightness of the sub image signal to be the reference brightness of the present picture at a predetermined time constant. That is, when time variation in the brightness of the sub image signal or time variation in the brightness average value of the main image signal is small, the brightness adjusting part 10 makes the actual brightness of the sub image signal $Ys(n)$ converge on the reference brightness gradually.

When the difference between brightness average value of the main image signal of the preceding picture and the brightness average value of the present picture is greater than a predetermined threshold, or when the difference between the actual brightness of the sub image signal of the preceding picture and the reference brightness of the sub image signal of the present picture is greater than a predetermined threshold, the brightness adjusting part 10 adjusts the brightness of the sub image signal to be the reference brightness of the present picture instantly. That is, when time variation in the brightness average value of the main image signal is large, the brightness adjusting part 10 makes the brightness of the sub image signal follow the brightness of the main image signal instantly. Therefore, no delay in brightness variation in the sub image signal with respect to brightness variation in the main image signal occurs.

In the first embodiment, the brightness average value calculating part 9 calculates the moving average value of the brightness average value of the main image signal and outputs it to the brightness adjusting part 10. Therefore, even if the brightness average value of the main image signal undergoes a significant variation with time temporarily, no flicker occurs in the sub image.

According to the image reproducing device and the image reproducing method of the first embodiment, when the brightness of the main image signal is high, the brightness of the sub image is adjusted to be high, and when the brightness of the main image signal is low, the brightness of the sub image is adjusted to be low. Therefore, it is possible to output an image signal that does not cause much eyestrain and is easily viewable for users.

Second Embodiment

Figure 6:
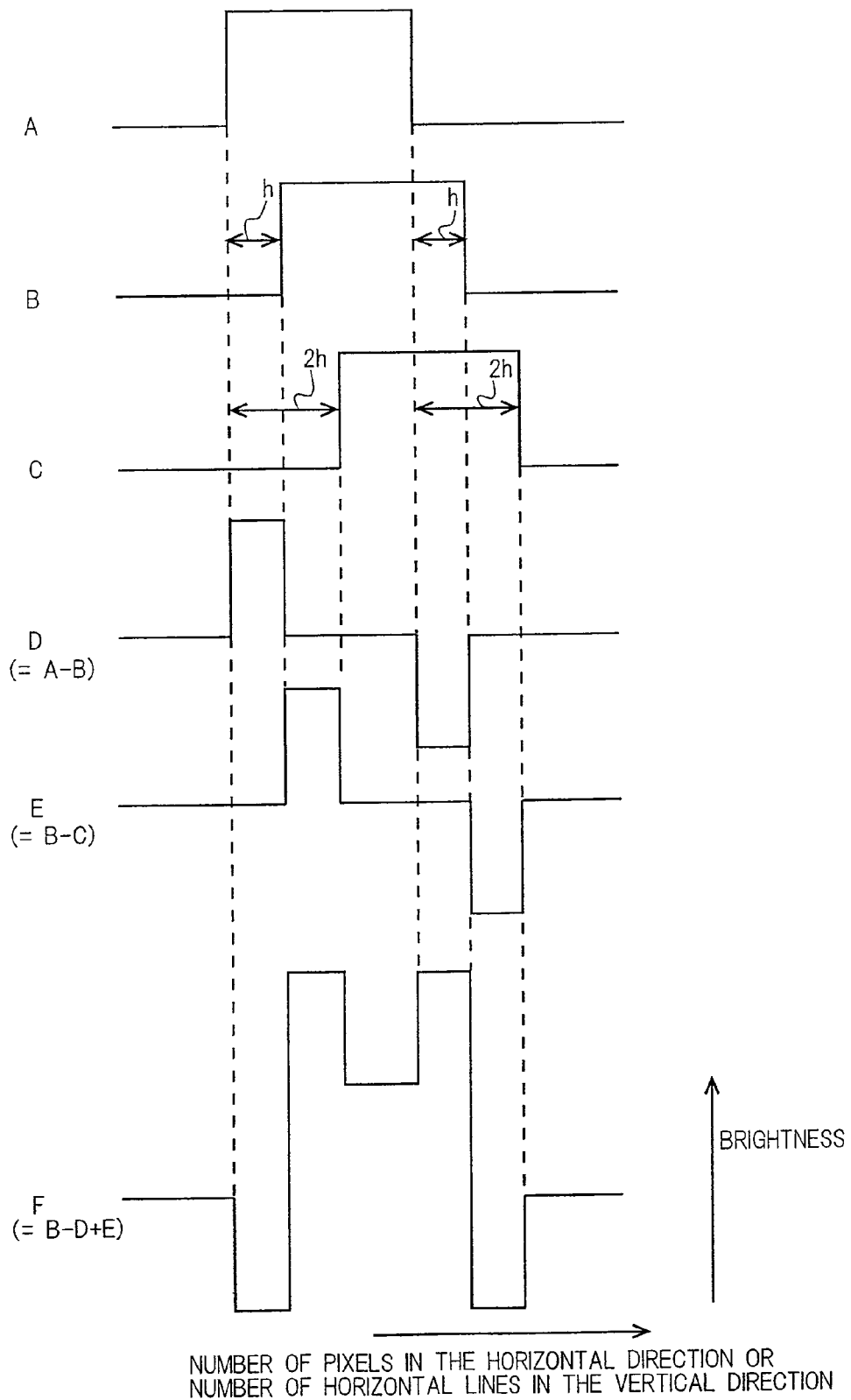
FIG. 6 is a schematic diagram of a contrast adjusting method in accordance with the second embodiment of the present invention.

Referring to FIG. 2, FIG. 5 and FIG. 6, an image reproducing device (including an image reproducing method) in accordance with a second embodiment of the present invention will be described.

FIG. 5 is a block diagram for showing the configuration of the image reproducing device in accordance with the second embodiment of the present invention. The image reproducing device of the second embodiment has the configuration in which a contrast detecting part 12 and a contrast adjusting part 14 are added to the image reproducing device of the first embodiment. The contrast detecting part 12 has a contrast calculating part 13. The contrast adjusting part 14 has a parameter table for adjusting sub image contrast 15. As other elements are identical to those in the image reproducing device of the first embodiment, common blocks are marked with a common reference numeral and therefore the explanation is omitted. The image reproducing device of the second embodiment adjusts the brightness of the sub image signal based on the brightness average value of the main image signal and adjusts the contrast of the sub image signal based on the brightness average value and the contrast of the main image signal.

The operation of the contrast detecting part 12 will be described. The contrast detecting part 12 receives the main image signal from the main image signal decoding part 2. The contrast calculating part 13 extracts the main image signal in the average value calculating region 202 (FIG. 2) for each field, filters the signal with a band-pass filter for passing a predetermined bandwidth (for example, frequency band of 1 to 1.5 MHz) and calculates a mean square amplitude. The contrast detecting part 12 sends the value of the mean square amplitude of the main image signal to the contrast adjusting part 14.

The contrast adjusting part 14 adjusts the contrast of the sub image signal. A target value $G(i, j)$ ($1 \square i \square p$, $1 \square j \square q$) of the contrast value using parameters as the brightness average value of the main image signal detected by the brightness detecting part 8 and the mean square amplitude calculated by the contrast detecting part 12 are written into the parameter table for adjusting sub image contrast 15 that contained in the contrast adjusting part 14. The brightness average value of the main image signal is separated into p graduations (p is an arbitrary positive integer not less than 2) and the contrast of the main image signal is separated into q graduations (q is an arbitrary positive integer not less than 2). A maximum value and a minimum value for each graduation are also written into the parameter table for adjusting sub image contrast 15.

$G(i, j)$ is a target value of the contrast value $X(n)$ of the sub image signal. An actual contrast value of the sub image signal is defined as $X(n)$.

The contrast adjusting part 14 calculates the difference $\Delta Ys = D(i) - Ys(n-1)$ between the reference brightness $D(i)$ of the sub image signal of the present field and an actual brightness $Ys(n-1)$ of the sub image signal of the preceding field and determines whether $\Delta Ys$ is not less than a predetermined threshold or not.

When $\Delta Ys$ is not less than the predetermined threshold, the actual contrast value $X(n)$ of the sub image signal of the present field is made to be the target value $G(i, j)$ instantly. When $\Delta Ys$ is less than the predetermined threshold, the actual contrast value $X(n)$ of the sub image signal of the present field is made to gradually get close to the target value $G(i, j)$ from the present actual contrast value $X(n-1)$ at a predetermined time constant. For example, the actual contrast value X of the sub image signal is incremented or decremented at each predetermined time to converge on the target value $G(i, j)$.

As substitute for the configuration of the second embodiment, the contrast adjusting part 14 may calculate the difference $\Delta Y = \Sigma y(k)/m - Y(n-1)$ between the brightness average value of the main image signal of the present field $\Sigma y(k)/m$ and the brightness average value of the main image signal of the preceding field $Y(n-1)$. It is determined whether the absolute value of $\Delta Y$ is not less than a predetermined threshold or not.

When $\Delta Y$ is greater than the predetermined threshold, the contrast adjusting part 14 sets the brightness average value of the main image signal of the present field as $Y(n) = \Sigma y(k)/m$ and reads the target value $G(i, j)$ of the contrast of the sub image signal corresponding to $Y(n) = \Sigma y(k)/m$ from the table. The actual contrast value X of the sub image signal of the present field is made to the $G(i, j)$ instantly.

When $\Delta Y$ is not greater than the predetermined threshold, the brightness average value of the main image signal of the present field is made to be $Y(n) = \{\Sigma y(k)/m + Y(n-1)\}/2$ and reads the target value $G(i, j)$ of the contrast of the sub image signal corresponding to $Y(n)$ from the table. The actual contrast value $X(n)$ of the sub image signal of the present field is made to gradually get closer to the target value $G(i, j)$ from the present actual contrast value $X(n-1)$ at a predetermined time constant.

FIG. 6 is a schematic diagram of a contrast adjusting method in accordance with the second embodiment of the present invention. In FIG. 6, horizontal axes of waveforms A, B, C, D, E and F represent the number of pixels in the horizontal direction and their vertical axes represent brightness. In FIG. 6, A is an example of the brightness signal of the sub image prior to adjusting the contrast. The level of the brightness signal is adjusted by the brightness adjusting part 10. The actual contrast value $X(n)$ of the sub image signal of the present field is set to be h. Firstly, a brightness signal A is moved by the predetermined number of pixels h in the positive direction of horizontal axis (a signal B). Next, the brightness signal B is moved by the predetermined number of pixels h in the positive direction of horizontal axis (a signal C). A signal D is obtained by subtracting the signal B from the signal A. A signal E is obtained by subtracting the signal C from the signal B. A signal F obtained by subtracting the signal D from the signal B and adding the signal E (=B−D+E) is the sub image signal, the contrast of which is adjusted. A signal F is the signal that outline of the signal A is highlighted in the horizontal direction (the signal that the character has a highlighted outline on its right and left sides). Similarly, the contrast adjusting part 14 adjusts the contrast also in the vertical direction. In FIG. 6, the signal F that outline of the signal A is highlighted in the vertical direction (the signal that the character has a highlighted outline on its upside and downside) is obtained by regarding the horizontal axis as the number of horizontal line in the vertical direction and performing the similar signal processing to the horizontal direction.

When the contrast value $X(n)$ is large, the width of the peak black level and the peak white level that outline is highlighted is wide. When the contrast value $X(n)$ is small, the width of the peak black level and the peak white level that outline is highlighted is narrow. As substitute for the second embodiment, the depth of the peak black level and the height of the peak white level may be varied depending on the contrast value $X(n)$. The depth and width of the peak black level and the height and width of the peak white level may be varied.

The image signal composing part 4 composes the output sub image signal, the brightness and contrast of which are adjusted in the brightness adjusting part 10 and the contrast adjusting part 14 based on the brightness average value and the mean square amplitude of the main image signal and the main image signal read from the buffer memory 3 in sync with time, and transfers the composed signal (second image signal) of the main image signal and the sub image signal to the image signal outputting part 5.

According to the image reproducing device and the image reproducing method of the second embodiment, when the brightness of the main image signal is high, the brightness of the sub image is adjusted to be high, and when the brightness of the main image signal is low, the brightness of the sub image is adjusted to be low. Further, when the brightness of the main image signal is high or the contrast of the main image signal is large, the contrast of the sub image is adjusted to be large, and when the brightness of the main image signal is low or the contrast of the main image signal is small, the contrast of the sub image is adjusted to be small. Therefore, it is possible to output an image signal that does not cause much eyestrain and is easily viewable for users.

The brightness detecting part 8 and the contrast detecting part 12 may be incorporated into one block to calculate the brightness average value and the contrast of the main image signal concurrently.

The brightness adjusting part 10 and the contrast adjusting part 14 may be incorporated into one block to adjust the brightness and the contrast of the sub image signal concurrently.

The configuration in which the contrast of the sub image signal is firstly adjusted and then the brightness of the sub image signal is adjusted may be adopted.

Third Embodiment

Figure 7:
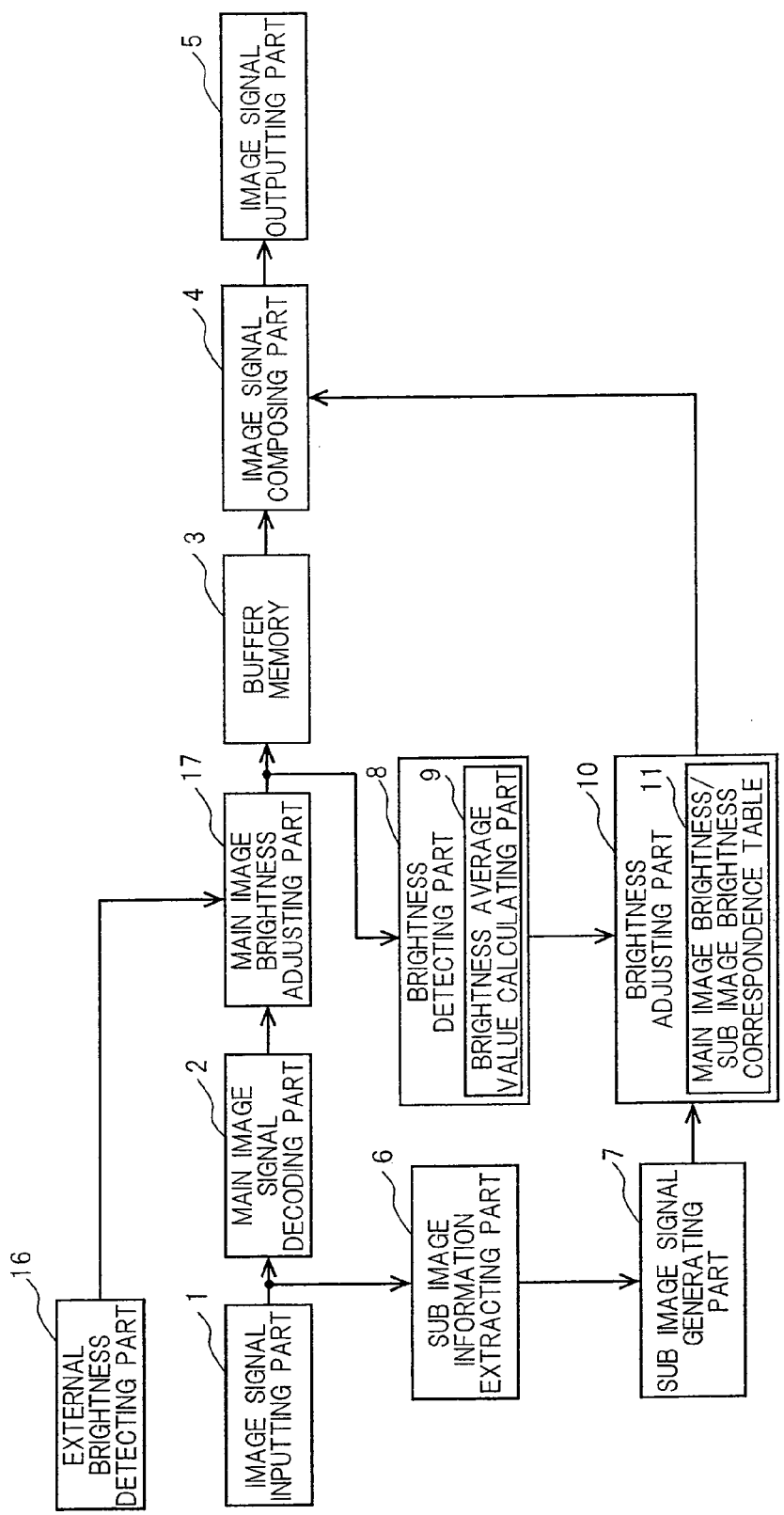
FIG. 7 is a block diagram of an image reproducing device in accordance with a third embodiment of the present invention.

Referring to FIG. 7, an image reproducing device (including an image reproducing method) in accordance with a third embodiment of the present invention will be described.

FIG. 7 is a block diagram for showing the configuration of the image reproducing device in accordance with the third embodiment of the present invention. The image reproducing device of the third embodiment has the configuration in which an external brightness detecting part 16 and a main signal brightness adjusting part 17 are added to the image reproducing device of the first embodiment. As other elements are identical to those in the image reproducing device of the first embodiment, common blocks are marked with a common reference numeral and therefore the explanation is omitted.

The image reproducing device of the third embodiment adjusts the brightness of the main image signal according to the brightness of external light and then calculates the brightness average value of the main image signal, and based on the brightness average value, adjusts the brightness of the sub image signal. The "brightness of external light" refers to the brightness of the place where the image signal (second image signal) output from the image signal outputting part 5 is displayed. Typically, it is an illuminance at a display screen of a display device (not shown) connected to the image signal outputting part 5. In this embodiment, the image signal is an output signal (output signal according to the input light quantity) of a photo detecting device that is located in the periphery of a display screen of the display device connected to the image signal outputting part 5 and receives a part of light radiated from outside toward the display screen.

The external brightness detecting part 16 detects the external brightness (illuminance) of the place where the image signal (second image signal) output from the image signal outputting part 5 is displayed and transmits it to the main image brightness adjusting part 17. The main image brightness adjusting part 17 adjusts the brightness of the main image signal input from the main image signal decoding part 2 according to the brightness of external light and transfers the main image signal to the buffer memory 3 and the brightness detecting part 8. The brightness of the main image signal is adjusted to be high when the brightness of external light is high (bright), and adjusted to be low when the brightness of external light is low (dark).

The brightness detecting part 8 receives input of the main image signal, the brightness of which is adjusted, and calculates the brightness average value according to the similar method to that of the first embodiment. The brightness adjusting part 10 adjusts the brightness of the sub image signal received from the sub image signal generating part 7 based on the brightness average value of the main image signal according to the similar method to that of the first embodiment and transfers the sub image signal to the image signal composing part 4. The image signal composing part 4 composes the main image signal read from the buffer memory 3 and the sub image signal received from the brightness adjusting part 10 in sync with time and transfers the composed image signal (second image signal) to the image signal outputting part 5. The image signal outputting part 5 transfers the image signal with subtitles (second image signal) to the external display device.

The image reproducing device of the third embodiment adjusts the brightness of the main image signal according to the external brightness (illuminance) of the place where the image signal (second image signal) output from the image signal outputting part 5 is displayed and further adjusts the brightness of the sub image signal based on the brightness average value of the main image signal. The brightness of the sub image signal is adjusted to be high when the external brightness is high, and the brightness of the sub image signal is adjusted to be low when the external brightness is low. The brightness of the sub image signal is adjusted to be easily viewable bright. The image reproducing device of the present invention can output an image that does not cause much eyestrain and is easily viewable for users.

Fourth Embodiment

Figure 8:
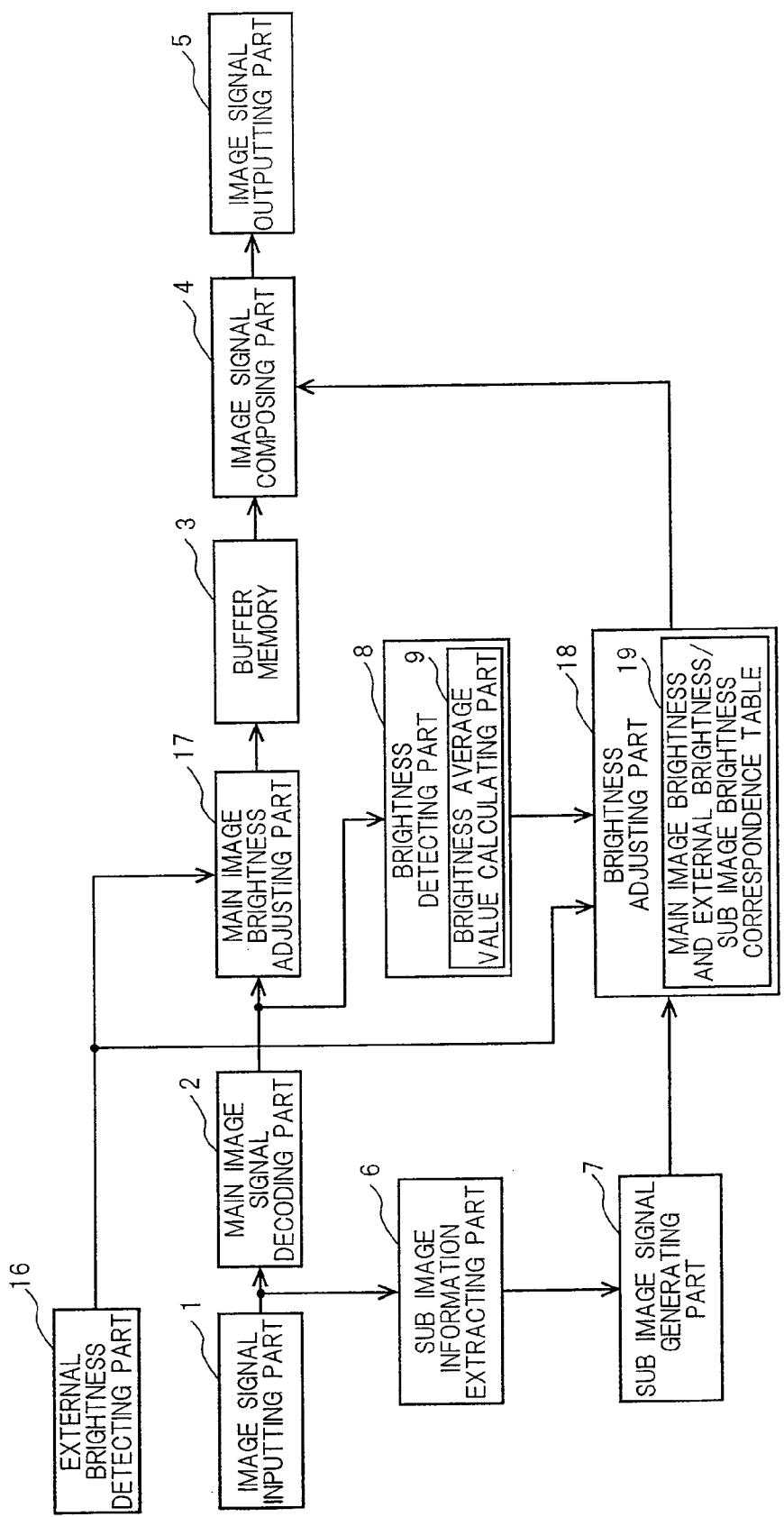
FIG. 8 is a schematic diagram of an image reproducing device in accordance with a fourth embodiment of the present invention.

Referring to FIG. 8, an image reproducing device (including an image reproducing method) in accordance with a fourth embodiment of the present invention will be described.

FIG. 8 is a block diagram for showing the configuration of the image reproducing device in accordance with the fourth embodiment of the present invention. The image reproducing device of the fourth embodiment has the configuration in which the brightness adjusting part 10 of the image reproducing device of the third embodiment is replaced with a brightness adjusting part 18. The brightness adjusting part 18 has a main image brightness and external brightness/sub image brightness correspondence table 19. Common blocks to the image reproducing device of the third embodiment are marked with a common reference numeral and therefore the explanation is omitted.

The image reproducing device of the fourth embodiment composes the main image signal, the brightness of which is adjusted based on the brightness (illuminance) of external light, and the sub image signal, the brightness of which is adjusted based on brightness (illuminance) of external light and the brightness average value of the main image signal, the brightness of which is not adjusted, in sync with time and outputs the composed signal.

The external brightness detecting part 16 detects the brightness (illuminance) of the place where the image signal (second image signal) output from the image signal outputting part 5 is displayed and transmits it to the main image brightness adjusting part 17 and the brightness adjusting part 18. The main image brightness adjusting part 17 adjusts the main image signal input from the main image signal decoding part 2 according to the brightness of external light and transfers the main image signal the buffer memory 3. The brightness of the main image signal is adjusted to be high when the external brightness is high, and is adjusted to be low when the external brightness is low.

The brightness detecting part 8 receives input of the main image signal (the main image signal, the brightness of which is not adjusted according to the brightness of external light) from the main image signal decoding part 2, and calculates the brightness average value according to the similar method to that of the first embodiment. The brightness adjusting part 18 adjusts the brightness of the sub image signal received from the sub image signal generating part 7 based on the brightness average value of the main image signal and the brightness of external light and transfers the sub image signal to the image signal composing part 4. A maximum value and a minimum value for each graduation of plural gradations into which the brightness average value of the main image signal and the brightness of external light are divided and the brightness of the corresponding sub image signal are also written into the main image brightness and external brightness/sub image brightness correspondence table 19. When the brightness average value of the main image signal is high or the external brightness is high, the brightness of the sub image signal is set to be high. When the brightness average value of the main image signal is low or the external brightness is low, the brightness of the sub image signal is set to be low.

The image signal composing part 4 composes the main image signal read from the buffer memory 3 and the sub image signal received from the brightness adjusting part 18 in sync with time and transfers the composed image signal (second image signal) to the image signal outputting part 5. The image signal outputting part 5 transfers the image signal with subtitle (second image signal) to the external display device.

The image reproducing device of the fourth embodiment composes the main image signal, the brightness of which is adjusted based on the brightness of external light, and the sub image signal, the brightness of which is adjusted based on the brightness of external light and the brightness average value of the main image signal, and outputs the composed signal. Therefore, it is possible to output an image that does not cause much eyestrain and is easily viewable for users.

The configuration in which the brightness adjusting part 18 adjusts the brightness of the sub image signal only according to the brightness of external light may be adopted.

Fifth Embodiment

Figure 9:
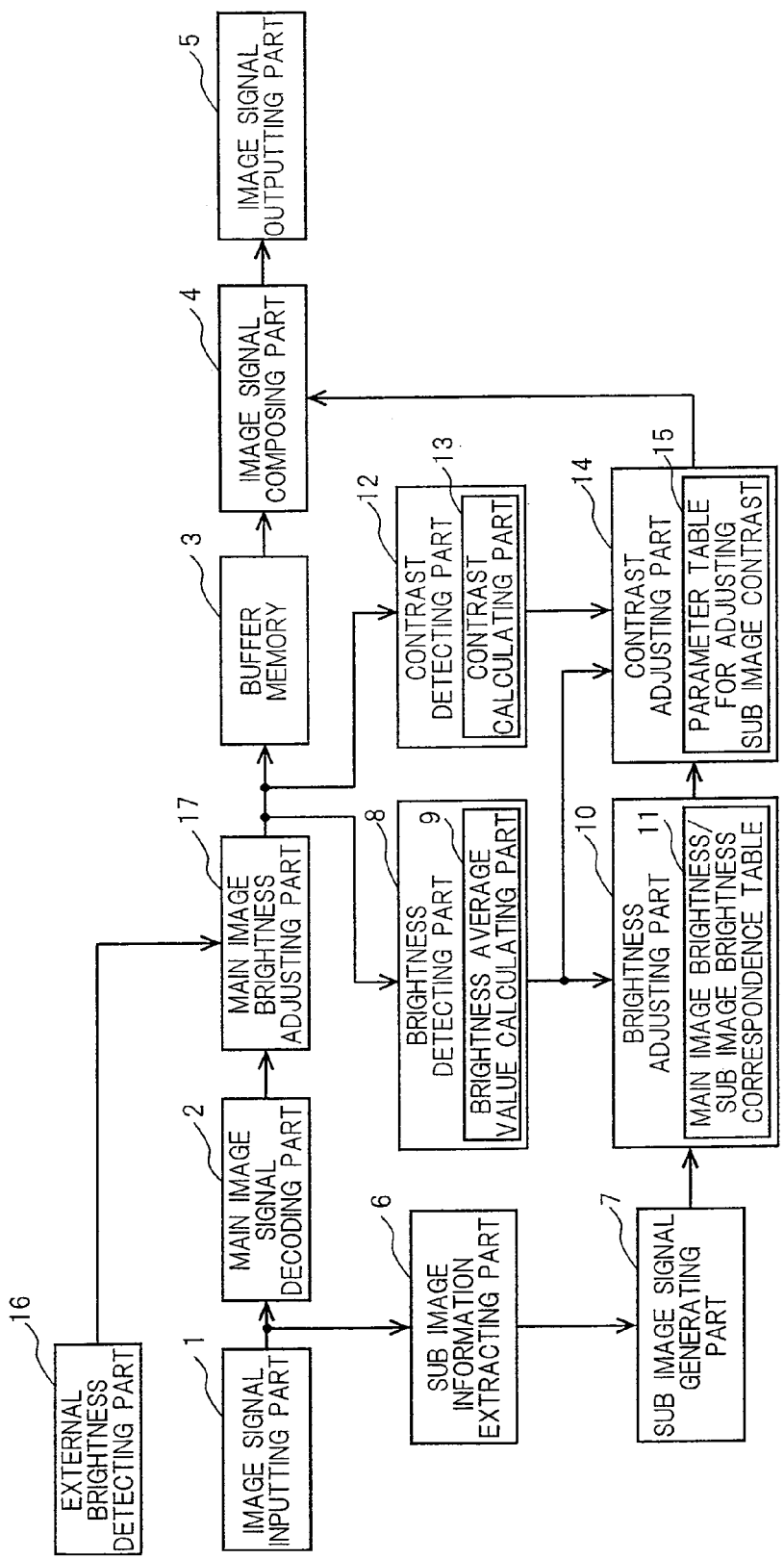
FIG. 9 is a schematic diagram of an image reproducing device in accordance with a fifth embodiment of the present invention.

Referring to FIG. 9, an image reproducing device (including an image reproducing method) in accordance with a fifth embodiment of the present invention will be described.

FIG. 9 is a block diagram for showing the configuration of the image reproducing device in accordance with the fifth embodiment of the present invention. The image reproducing device of the fifth embodiment has the configuration in which the contrast detecting part 12 and the contrast adjusting part 14 are added to the image reproducing device of the third embodiment. The contrast adjusting part 14 has the parameter table for adjusting sub image contrast 15. As other elements are identical to those in the image reproducing device of the third embodiment, common blocks are marked with a common reference numeral and therefore the explanation is omitted.

The image reproducing device of the fifth embodiment adjusts the brightness of the main image signal according to the brightness of external light and then calculates the brightness average value and the contrast of the main image signal, adjusts the brightness of the sub image signal based on the brightness average value, and adjusts the contrast of the sub image signal based on the brightness average value and the contrast.

The contrast detecting part 12 receives input of the main image signal, the brightness of which is adjusted, and calculates the contrast value according to the similar method to that of the second embodiment. The contrast adjusting part 14 adjusts the contrast of the sub image signal received from the brightness adjusting part 10 based on the brightness average value and the contrast of the main image signal according to the similar method to that of the second embodiment and transfers the sub image signal to the image signal composing part 4. The image signal composing part 4 composes the main image signal read from the buffer memory 3 and the sub image signal received from the contrast adjusting part 14 in sync with time and transfers the composed image signal (second image signal) to the image signal outputting part 5. The image signal outputting part 5 transfers the image signal with subtitle (second image signal) to the external display device.

The image reproducing device of the fifth embodiment adjusts the brightness of the main image signal according to the external brightness (illuminance) of the place where the image signal (second image signal) output from the image signal outputting part 5 is displayed and further adjusts the brightness and the contrast of the sub image signal based on the brightness average value and the contrast of the main image signal. When the external brightness is high, the sub image signal is adjusted to be high in brightness and large in contrast. When the external brightness is low, the sub image signal is adjusted to be low in brightness and small in contrast. The brightness and the contrast of the sub image signal are adjusted to be easily viewable bright. The image reproducing device of the present invention can output an image that does not cause much eyestrain for users.

Sixth Embodiment

Figure 10:
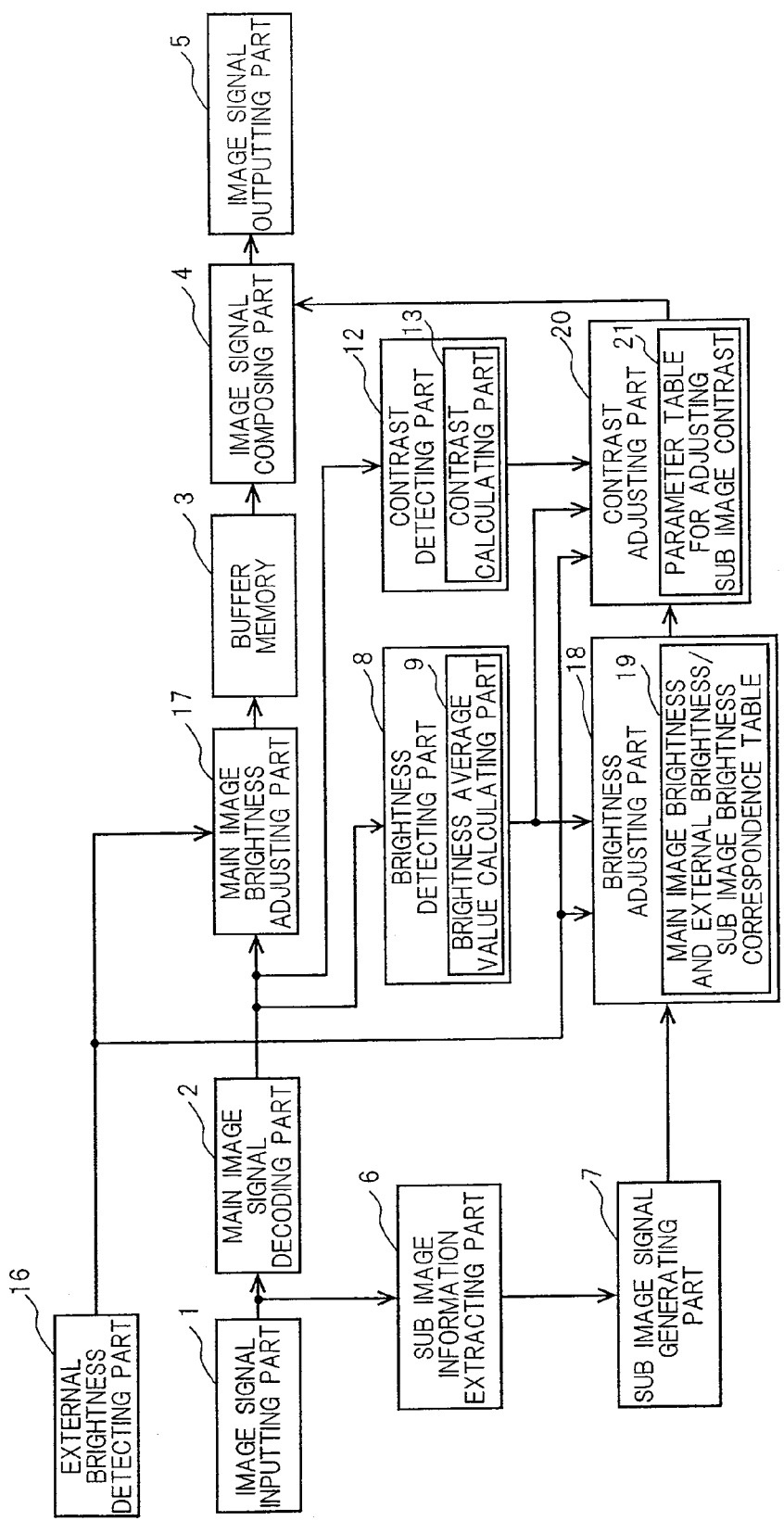
FIG. 10 is a schematic diagram of an image reproducing device in accordance with a sixth embodiment of the present invention.

Referring to FIG. 10, an image reproducing device (including an image reproducing method) in accordance with a sixth embodiment of the present invention will be described.

FIG. 10 is a block diagram for showing the configuration of the image reproducing device in accordance with the sixth embodiment of the present invention. The image reproducing device of the sixth embodiment has the configuration in which the contrast detecting part 12 (including a contrast calculating part 13 and a contrast adjusting part 20 (including a parameter table for adjusting sub image contrast 21) are added to the image reproducing device of the fourth embodiment. A maximum value and a minimum value for each graduation of plural gradations into which the brightness average value and the contrast value of the main image signal (the main image signal, brightness of which is not adjusted according to the brightness of external light), and the brightness of external light are divided and the brightness of the corresponding sub image signal are also written into parameter table for adjusting sub image contrast 21. Common blocks to the image reproducing device of the fourth embodiment (FIG. 8) are marked with a common reference numeral and therefore the explanation is omitted.

The image reproducing device of the sixth embodiment composes the main image signal, the brightness of which is adjusted based on the brightness (illuminance) of external light, and the sub image signal, the brightness of which is adjusted based on the brightness (illuminance) of external light and the brightness average value of the main image signal, the brightness of which is not adjusted, and the contrast of the sub image signal is adjusted based on the brightness (illuminance) of external light and the brightness average value and the contrast value of the main image signal, the brightness of which is not adjusted, in sync with time, and outputs the composed signal.

The external brightness detecting part 16 detects the brightness (illuminance) of the place where the image signal (second image signal) output from the image signal outputting part 5 is displayed and transmits it to the main image brightness adjusting part 17, the brightness adjusting part 18 and the contrast adjusting part 20. The main image brightness adjusting part 17 adjusts the brightness of the main image signal input from the main image signal decoding part 2 and transfers the main image signal to the buffer memory 3. The brightness of the main image signal is adjusted to be high when the brightness of external light is high, and is adjusted to be low when the brightness of external light is low.

The contrast detecting part 8 receives input of the main image signal (the main image signal, the brightness of which is not adjusted according to the brightness of external light) from the main image signal decoding part 2, and calculates the brightness average value according to the similar method to that of the first embodiment. The brightness adjusting part 18 adjusts the brightness of the sub image signal received from the sub image signal generating part 7 based on the brightness average value of the main image signal and the brightness of external light and outputs the sub image signal.

The contrast detecting part 12 receives input of the main image signal (the main image signal, the brightness of which is not adjusted according to the brightness of external light) from the main image signal decoding part 2 and calculates the contrast value according to the similar method to that of the second embodiment. The contrast adjusting part 20 adjusts the contrast of the sub image signal received from the brightness adjusting part 18 based on the brightness average value and the contrast value of the main image signal and the brightness of external light and transfers the sub image signal to the image signal composing part 4.

When the brightness average value of the main image is high, the contrast of the main image is large, or the external brightness is high, the contrast of the sub image signal is adjusted to be large. When the brightness average value of the main image is low, the contrast of the main image is small, or the external brightness is low, the contrast of the sub image signal is adjusted to be small.

The image signal composing part 4 composes the main image signal read from the buffer memory 3 and the sub image signal received from the contrast adjusting part 20 in sync with time, and transfers the composed signal (second image signal) to the image signal outputting part 5. The image signal outputting part 5 transfers the image signal with subtitle (second image signal) to the external display device.

The image reproducing device of the sixth embodiment composes the main image signal, the brightness of which is adjusted based on the brightness of external light, and the sub image signal, the brightness and the contrast of which are adjusted based on the brightness of external light and the brightness average value and the contrast value of the main image signal, and outputs the composed signal. Therefore, it is possible to output an image that does not cause much eyestrain and is easily viewable for users.

In the first embodiment to the sixth embodiment, although calculation of the brightness average value of the main image signal, detection of the contrast of the main image signal, adjustment of the brightness of the sub image signal and adjustment of the contrast of the sub image signal are performed on a field by-field basis, they may be performed by a frame-by-frame basis.

In the first embodiment to the sixth embodiment, although the image signal read from a DVD is input to the image signal inputting part 1, other image signal including the main image signal and the sub image signal may be input. The image reproducing device may be, for example, a tuner or television that receives airwave including the main image signal and the sub image signal and displays it on the display.

In the first embodiment to the sixth embodiment, the brightness adjusting part 10 uses the table to derive the brightness value of the sub image signal based on the brightness average value of the main image signal. Instead of the table, a predetermined computing equation may be used.

In the second, fifth and sixth embodiments, the contrast adjusting part 14 uses the table to derive the contrast of the sub image signal. Instead of the table, a predetermined computing equation may be used.

In the first embodiment to the sixth embodiment, the character is represented in white (only the brightness signal). Instead of this, the character may be represented in color. For example, the brightness value superimposed on the colored character is adjusted based on the brightness average value of the main image signal.

In the first embodiment to the sixth embodiment, the brightness adjusting part 10 adjusts the brightness of the sub image signal based on only the brightness average value of the main image signal. Instead of this, the brightness adjusting part 10 may adjust the brightness of the sub image signal based on the brightness average value and the contrast of the main image signal.

In the second, fifth and sixth embodiments, the contrast adjusting part 14 adjusts the contrast of the sub image signal based on the brightness average value and the contrast of the main image signal. Instead of this, the contrast adjusting part 14 may adjust the contrast of the sub image signal based on only the brightness average value or the contrast of the main image signal. When the contrast adjusting part 14 adjusts the contrast of the sub image signal based on only the brightness average value of the main image signal, the contrast detecting part 12 need not to be provided.

The image reproducing device and the image reproducing method of the present invention can control the brightness and/or contrast of the sub image according to the brightness and/or contrast of the main image and has an advantageous effect of minimizing eyestrain of users.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

The image reproducing device and the image reproducing method of the present invention are useful as an image reproducing device and an image reproducing method including a main image signal and a sub image signal.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An image reproducing device comprising:
an image signal inputting part for receiving input of a first image signal;

a sub image signal generating part for generating a sub image signal from information on a sub image extracted from said first image signal;

a main image signal decoding part for extracting a main image signal from said first image signal and decoding said main image signal;

a brightness detecting part for detecting a brightness of said main image signal, calculating a brightness average value of each field of the main image signal, and calculating a moving average value of the brightness average values;

a brightness adjusting part for adjusting a brightness of said sub image signal;

an image signal composing part for composing said main image signal and said sub image signal and generating a second image signal; and an image signal outputting part for outputting said second image signal, wherein, when a difference between a moving average value of the main image signal of a preceding field and a brightness average value of the main image signal of a present field is not greater than a predetermined threshold, the brightness adjusting part adjusts a brightness of the sub image signal of the present field to be a predetermined reference brightness value corresponding to the moving average value of the main image signal of the present field, using a predetermined time constant, and wherein, when the difference between a moving average value of the main image signal of a preceding field is greater than the predetermined threshold, the brightness adjusting part instantly adjusts the brightness of the sub image signal of the present field to be a predetermined reference brightness value corresponding to the brightness average value of the main image signal of the present field.

2. An image reproducing device as stated in claim 1 further comprising a contrast adjusting part for adjusting a contrast of said sub image signal based on said brightness average value, wherein said image signal composing part composes said main image signal and said sub image signal, the brightness and the contrast of which are adjusted, and generates a second image signal.

3. An image reproducing device as stated in claim 1 further comprising a contrast detecting part for detecting a contrast of said main image signal, wherein said brightness adjusting part adjusts the brightness of the sub image signal based on said brightness average value and said contrast.

4. An image reproducing device as stated in claim 1 further comprising:

a contrast detecting part for detecting the contrast of said main image signal; and a contrast adjusting part for adjusting the contrast of said sub image signal based on said contrast or said brightness average value and said contrast, wherein said image signal composing part composes said main image signal and said sub image signal, the brightness and the contrast of which are adjusted, and generates a second image signal.

5. An image reproducing method performed by an image reproducing apparatus comprising:

an image signal inputting step of receiving input of a first image signal;

a sub image signal generating step of generating a sub image signal from information on a sub image extracted from said first image signal;

a main image signal decoding step of extracting a main image signal from said first image signal and decoding said main image signal;

a brightness detecting step of detecting a brightness of said main image signal, calculating a brightness average value of each field of the main image signal, and calculating a moving average value of the brightness average values;

a brightness adjusting step of adjusting a brightness of said sub image signal;

an image signal composing step of composing said main image signal and said sub image signal, the brightness of which is adjusted, and generating a second image signal; and an image signal outputting step of outputting said second image signal, wherein, the method further comprises the steps of:

when a difference between a moving average value of the main image signal of a preceding field and a brightness average value of a main signal of a present field is not greater than a predetermined threshold, the brightness adjusting step adjusts a brightness of the sub image signal of the present field to be a predetermined reference brightness value corresponding to the moving average value of the main image signal of the present field, using a predetermined time constant, and wherein, when the difference between a moving average value of the main image signal of a preceding field and a brightness average value of a main signal of a present field is greater than the predetermined threshold, the brightness adjusting step instantly adjusts the brightness of the sub image signal of the present field to be a predetermined reference brightness value corresponding to the brightness average value of the main image signal of the present field.

6. An image reproducing method as stated in claim 5 further comprising a contrast adjusting step of adjusting a contrast of said sub image signal based on said brightness average value, wherein said image signal composing step composes said main image signal and said sub image signal, the brightness and the contrast of which are adjusted, and generates a second image signal.

7. An image reproducing method as stated in claim 5 further comprising a contrast detecting step of detecting a contrast of said main image signal, wherein said brightness adjusting step adjusts the brightness of the sub image signal based on said brightness average value and said contrast.

8. An image reproducing method as stated in claim 5 further comprising:

a contrast detecting step of detecting the contrast of said main image signal; and a contrast adjusting step of adjusting the contrast of said sub image signal based on said contrast or said brightness average value and said contrast, wherein said image signal composing step composes said main image signal and said sub image signal, the brightness and the contrast of which are adjusted, and generates a second image signal.

* * * * *

UNITED STATES PATENT AND TRADEMARK OFFICE
CERTIFICATE OF CORRECTION

PATENT NO. : 7,813,584 B2
APPLICATION NO. : 11/877132
DATED : October 12, 2010
INVENTOR(S) : Ikuoh Nishida et al.

Page 1 of 1

It is certified that error appears in the above-identified patent and that said Letters Patent is hereby corrected as shown below:

Title Page, item (56) "References Cited", Col. 1:

Under "U.S. Patent Documents", insert
-- 5,432,566 A   07/1995   Tanaka et al --;

Title Page, item (56) "References Cited", Col. 2:

Under "Foreign Patent Documents", insert
-- JP   6311396   04/1994 -- and
-- JP   11164192  06/1999 --.

Signed and Sealed this
Ninth Day of August, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,813,584 B2 |
| APPLICATION NO. | : 11/877132 |
| DATED | : October 12, 2010 |
| INVENTOR(S) | : Ikuoh Nishida et al. |

It is certified that error appears in the above-identified patent and that said Letters Patent is hereby corrected as shown below:

Title Page, item (56) "References Cited", Col. 2, Under "Foreign Patent Documents":

"JP 6311396 04/1994" should read -- JP 6311396  11/1994 --.

Signed and Sealed this
Twenty-second Day of November, 2011

David J. Kappos
*Director of the United States Patent and Trademark Office*